United States Patent Office 3,591,677
Patented July 6, 1971

3,591,677
ALLERGENIC EXTRACT AND PROCESS FOR PREPARING SAME
Margaret Strauss Kramer, New York, N.Y., assignor to Miles Laboratories, Inc., Elkhart, Ind.
No Drawing. Filed Apr. 3, 1969, Ser. No. 813,297
Int. Cl. A61k 23/00
U.S. Cl. 424—91             14 Claims

ABSTRACT OF THE DISCLOSURE

A process for preparing antigenic or allergenic extracts and the product obtained thereby comprising treating with an aqueous extracting fluid, substances known to contain physiologically active principles which elicit allergenic and/or antigenic responses, separating the aqueous extracting fluid containing the water-soluble active principles from the water-insoluble portion of the substance, treating the water-insoluble portion of the substance with an aqueous-organic solvent or non-aqueous solvent extracting fluid, separating in organic solvent extracting fluid from the portion of the substance insoluble therein, insolubilizing the active principles contained in said extracts by the addition thereto of an aluminum compound, separating the insolubilized active principles from the extracting fluids and preferably resuspending same in a physiologically acceptable aqueous fluid.

BACKGROUND OF THE INVENTION

It has long been known that various individuals upon contracting, and particularly inhaling, certain naturally occurring and synthetic organic particles or substances develop characteristic allergic reactions such as sneezing, activation of mucus glands, local edema, skin eruptions and vasodilation. These reactions are commonly called "hay fever" and even though the reaction in itself is not usually serious, it may lead to complications, both physiological and psychological. In a small child the constant presence of an allergic condition often causes permanent deformities in the body and particularly the facial structure not to mention the psychological effects of an ever present discomfort. Asthmatic conditions are also intimately connected with allergic reactions and may cause more serious complications. Medical science now recognizes the hay fever malady as a serious condition which must be treated with care and thoroughness.

In this regard, it has likewise been known for some time that extracts of the above noted allergenically or antigenically active substances, when injected subcutaneously, alleviate these allergic reactions in a majority of individuals. The exact physiological mechanism of this treatment, known in the art as hyposensitization, has not yet been completely and satisfactorily explained. Various theories however have been brought forward which attempt an explanation. One such theory assumes the formation of so-called blocking or neutralizing antibodies caused by injecting the extract, while another theory postulates that such treatment encourages the formation of union between antigen (or allergen) and antibody in the free circulation rather than in the shock tissue.

DESCRIPTION OF THE PRIOR ART

In the preparation of such allergenic extracts, it has been common practice in the past to simply extract the offending organic substance causing the allergic reaction with a physiologically acceptable aqueous extracting fluid such as a saline solution or a slightly alkaline saline solution. After separating the extraction fluid from the residue, this solution containing the active principles is sterilized and simply used as such, after, of course, making the proper serial dilution thereof. In such an extraction procedure the physiologically acceptable extracting fluid is selected and designed to protect the structural integrity of the antigenic molecule.

Recently, however, a method has been devised which results in a more complete and effective allergenic extract. This process is described in U.S. Pat. Nos. 3,148,121 and 3,148,122 and briefly comprises treating a whole undefatted allergenic substance with an aqueous heterocyclic tertiary amine extracting fluid, separating the liquid phase containing the active principles from the residue, discarding the residue and, in order to separate the active principles from the heterocyclic tertiary amine, adding water and an alum solution to the extract to precipitate the active principles therefrom. The precipitate is then washed many times with water to remove all of the heterocyclic tertiary amine and any excess alum, and is finally resuspended in a physiologically acceptable aqueous vehicle.

Initially, it was believed that the inclusion of the heterocyclic tertiary amine in the process merely resulted in a more complete allergenic extract, since the organic solvent soluble constituents were included in the extract as well as the water-soluble proteinaceous and carbohydrate fractions. Now, however, it is believed that the reactive chemical nature of the heterocyclic tertiary amine may cause a structural modification of the antigenic molecule which results in an allergenic treatment extract which is effective and relatively free from constitutional side reactions.

As effective and advantageous as these heterocyclic tertiary amine extracted-alum precipitated allergenic extracts [hereinafter called PEAP (pyridine extracted, alum precipitated) extracts, since pyridine is the preferable heterocyclic tertiary amine used in such a process] have been found to be, several limitations have appeared over the years. In this regard it was found that this type of extract could not be used for skin testing purposes, a situation clinical allergists usually wish to avoid, since they prefer to use the same natural substance and extract for both diagnosis and treatment. Such a procedure using the same extract insures that the treatment involves the exact antigen found to be the cause of the allergic skin reaction. The above limitation of PEAP extracts is believed to be due to the insolubility of the precipitate and/or the formation of a complex between the heterocyclic tertiary amine-extracted antigen and the alum used in the precipitation of the antigen from the extracting fluid.

There have also been some reported situations where an aqueous type extract has been effective where the PEAP extract has been relatively ineffective and vice versa. The conclusion must therefore be made that certain antigens are preferentially soluble in either aqueous or organic solvent extracting fluids. Moreover, the process parameters for preparing PEAP antigens using the prior art methods are rather lengthly, and the yield leaves much to be desired, i.e., in the range of about 50% of the PNU's (protein nitrogen units) originally extracted.

OBJECTS OF THE PRESENT INVENTION

It is therefore an object of the present invention to provide a more versatile and effective allergenic extract than that produced by prior art aqueous and PEAP methods.

It is another object to provide an improved process for preparing allergenic extracts without denaturation of the water-soluble protein fraction.

It is still another object to provide a combination aqueous-organic solvent extracting procedure whereby substantially all antigenic material is recovered in the processing thereof.

SUMMARY OF THE INVENTION

These and other objects which will become apparent from the following description and the claims appended thereto are achieved by (1) treating the allergenically and/or antigenically active substance with an aqueous extracting fluid, (2) separating the aqueous extracting fluid containing the water-soluble active principles from the water-insoluble portion of the substance, (3) treating the water-insoluble portion of the substance with an organic solvent extracting fluid, (4) separating the organic solvent extracting fluid from the water and organic solvent insoluble portion of the substance, (5) preferably, combining the extracting fluid containing the water-soluble active principles with the organic solvent soluble active principles, (6) insolubilizing the active principles contained in the extracts by the addition of an aluminum compound, (7) separating the insolubilized active principles from the extracting fluids, and (8) preferably resuspending the insolubilized active principles in a physiologically acceptable aqueous fluid.

DESCRIPTION OF THE PREFERRED EMBODIMENTS

The process according to the present invention is applicable to all allergenically active substances both of natural origin and synthetically prepared. Such substances include dusts, as ordinary dust found in homes and collected in vacuum sweepers and dust found in manufacturing facilities, such as sawdust; epithelials, such as cat, dog, horse and rabbit dander; feathers, such as from geese, ducks and chickens; seeds, such as cottonseed and kapok; insects and emanations from insects, such as bees, wasps, yellow jackets, hornets, and mosquitoes; pollens from trees, grasses and weeds, such as ragweed, orchard grass, maple trees, poplar trees; molds, such as Aspergillus and Alternaria; complex synthetic chemicals, such as antibiotics, and the like.

Initially, the allergenically active substance is extracted with an aqueous extracting fluid. This initial step is the same as that used in the preparation of prior art aqueous allergenic extracts and simply involves the use of a water or an aqueous buffered or isotonic extracting fluid. Such extracting fluids include phosphate buffered saline (Evan's) solution; Coca's solution comprising sodium bicarbonate, sodium chloride and phenol; glycerosaline; dextrose (Ungar's) solution; physiological saline; alcohol saline solution; and so forth. Such solutions are well known to those skilled in the art of treating allergic patients and more complete formulations including concentrations of ingredients may be found in any elementary textbook on allergy. These solutions are all rather mild extracting fluids, having an adjusted pH of from about 6.5 to about 8.0 and are designed to protect the structural integrity of the offending allergen or antigen molecule.

In preparing this initial aqueous extract of the allergen, the natural antigenic substance, after removal of physical contaminants and pulverization or subdivision, if necessary, is contacted with the extracting fluid for a period of from about one (1) hour to three (3) days or more with occasional agitation. Preferably the extraction is made with continuous agitation for a four (4) hour period. The allergen may also be defatted prior to contacting same with the aqueous extracting fluid; however, in certain instances this is either unnecessary or is believed to remove valuable antigenic material.

After the initial extraction with the neutral aqueous fluid, the water insoluble portion of the antigenic substance is separated from the aqueous fluid by either centrifuging or filtering and is washed several times with water or additional extracting fluid.

The water-insoluble portion of the antigenic substance or residue left from the initial extraction with the aqueous fluid is then treated with an organic solvent to remove the water-insoluble active principles therefrom. Although a non-aqueous organic solvent system may be used, the preferable fluid for use in this second extraction comprises a mixture of an aqueous phase and an organic solvent phase. The latter constituent of this extracting fluid may comprise a basic nitrogen containing solvent and preferably comprises an amine, and more preferably yet a heterocyclic tertiary amine such as for example, pyridine, pyridine derivatives such as lutidine, quinoline, collidine, picoline and the like.

Although the exact chemical effect of the organic solvent on the antigen molecule or structure thereof is not known, it is believed that the highly polar or basic nature of the above-noted solvents cause them to react with the water-insoluble antigens to form a compound therewith, or somehow alters the complex molecular structure of the protein, carbohydrate, lipo-protein or polypeptide which forms the basis for the allergenic nature of the offending substance.

The second constituent of this second extracting fluid, that is, the aqueous phase, may comprise plain distilled water or, preferably, a saline and/or alkaline, aqueous solution. In this regard, sodium bicarbonate, sodium chloride, sodium hydroxide, phosphate buffers and the like may be employed. When substances having an alkaline nature such as a heterocyclic tertiary amine are used in the extracting fluid, this second aqueous constituent may also consist of a buffer which adjusts the pH to a more neutral value. The resulting pH of the final extracting fluid prepared by mixing the amine organic solvent phase and the aqueous phase, may be from about pH 7.5 to pH 12.0. Since a wide variety of allergenic substance have been found adaptable to the present process, the pH of the extracting fluid and the composition thereof may be varied considerably to suit the particular allergenic substance. For example, ragweed pollen is known to contain a high and toxic fat or lipid content which, it has been suggested, contributes heavily to the allergenic nature of this substance. Other allergenic substances contain far less lipid material and in extracting these other substances one may wish to change the ratio of organic solvent phase to aqueous phase to compensate for such varying lipid contents. However, about equal parts of organic solvent phase and aqueous phase have been found to result in an extracting fluid having broad applicability.

This second extracting step usually comprises mixing the insoluble material with the extracting fluid and allowing the mixture to remain at a temperature of about from 20° C. to 25° C. for preferably 1 hour to three days or more with occasional agitation. The residue or water and organic solvent insoluble portion of the substance is then separated from the liquid phase which at this time contains the treated and solubilized water-insoluble or organic solvent soluble active allergenic principles.

Although the two extracts described above can be separately processed as described hereinafter, the preferable procedure of the present invention comprises combining the first and second extracts and immediately insolubilizing the active principles contained therein by the addition of an aluminum compound such as that described and used in U.S. Patents Nos. 3,148,121 and 3,148,122.

The above insolubilization is effected immediately after mixing the two extracts so as to prevent any possible denaturation of the labile water soluble antigens extracted with the first aqueous extracting fluid.

It will be appreciated that the recombination of the first and second extracts may be accomplished in a wide range of ratios depending upon the particular allergen being extracted as well as the sensitivity of the individual to the specific antigens in the first and second extracting fluids. Generally speaking, however, the first and second extracts are recombined in a ratio of from about 10:1 to about 1:10 with a preferable ratio of 1:1.

The above noted insolubilization step comprises the addition of an aluminum compound such as potassium alum or aluminum hydroxide to insolubilize the antigen and prepare a therapeutic dosage form having slow release properties. In this regard it has unexpectedly been found that the insolubilized precipitate or adsorption product using the combination aqueous and organic solvent treated extract of the present invention is superior to prior art alum precipitated antigens from defatted strictly aqueous extracted solutions thereof. Whereas such prior art preparations are gelatinous in nature and pharmaceutically unacceptable, the present preparations are particulate, homogeneous suspensions and are pharmaceutically elegant in appearance.

It should be noted here that it has also unexpectedly been found that the yield of precipitate from the extract using an aluminum compound to insolubilize the antigen, is dramatically greater than that obtained by using the prior art PEAP process. For example, yields of about 40–50% are achieved by using the prior art PEAP process, whereas in the present process about 80–90% yield is obtained. This yield is calculated on the basis of protein nitrogen in the extracting fluid as compared to protein nitrogen in the insolubilized precipitate or adsorption product.

In order to insure that the allergenic extract is sterile, it is the usual practice to pass a solution containing the thermolabile antigen extract through a bacterial filter, more commonly called a Seitz, micropore. Millipore® or membrane filter. Such procedures are well known in the art and are described in various texts relating thereto. In the present invention such sterilization may be accomplished in any liquid phase so long as the antigen is in solution. For example, both the first and second extracts may be sterilized or the final combination extract may be sterilized by filtration.

Referring now to the mode of use of the present preparation, such techniques are well known in the art and comprise the subcutaneous injection of a dilute suspension of the antigen followed by subsequently daily or weekly injections of gradually increasing concentration. Because of the extremely wide range of sensitivities of various individuals and the different release characteristics of the various therapeutic forms of the antigen, a regime of treatment is decided upon by the clinician on an individual basis.

In regard to dosage or potency of extract, the products of the present invention may be concentrated or diluted according to the basic strength of the initial extract and the desired potency of the final extract. The most common, although not entirely satisfactory means for standardizing the extract, is the analysis of the solution for PNU or protein nitrogen units. The deficiency of this method obviously is that all the antigenic fractions of the extract are not necessarily proteinaceous but may be carbohydrate, lipid or other non-nitrogenous molecules. In regard to potency of extract the usual practice is to standardize extracts to from about 100 PNU to about 10,000 PNU, the lower potency extracts being used in the initial phases of the hyposensitization therapy and the higher potency extracts as a sustaining or maintenance dose at greater time intervals.

The present invention is illustrated by the following examples but there is no intention to limit the scope of the present process or product thereto.

Example 1

Using a suitable sized extraction flask, 20 grams of an undefatted mixture of equal parts of high and low ragweed pollen was mixed with 200 ml. of an extracting fluid comprising a 1:1 (by volume) ratio of glycerol and 0.03 N sodium hydroxide solution. After allowing the mixture to stand with occasional mixing overnight, the insoluble pollen residue was separated from the extracting fluid containing the water soluble active principles by vacuum filtration. The yellow colored extract containing 54,700 PNU/ml. was capped and stored at about 3–5° C. The pollen residue remaining on the filter, was then transferred back to the original extraction flask and 200 ml. of a 1:1 (vol. to vol.) mixture of pyridine and 0.1 N sodium hydroxide added thereto. The contents of the flask were mixed well and allowed to stand at room temperature for 1–2 days with mixing after which time interval, the remaining insoluble pollen residue was separated from the organic solvent soluble active principles by means of a second vacuum filtration step and stored at 3–5° C. Analysis showed this second extract to contain 32,600 PNU/ml.

The first extract was then removed from the refrigerator and placed in a 45° C. water bath to redissolve the heavy precipitate which formed upon cooling the extract. The first and second extracts were then combined in equal parts and when analyzed were found to contain 43,800 PNU/ml. Two ml. of the combined extracts was pipetted into a small tube, mixed and 4.0 ml. of a 2% potassium aluminum sulfate in 0.25 N sulfuric acid added thereto. A heavy flocculant precipitate formed immediately which was removed by centrifugation and washed free of pyridine with water. The precipitate which was found to contain 40,200 PNU/ml. of extract (91.6% recovery), when resuspended in saline solution and standardized, may be used as an effective hyposensitization agent.

Examples 2–7

Example 1 was repeated except orchard grass pollen, house dust, stinging insects, timothy pollen, chicken feathers and birch tree pollen were substituted for the ragweed pollen. The results were substantially the same. The combined extracts are useful for hyposensitization therapy whereas the first aqueous extracts are useful for skin testing or diagnosis of an allergic condition.

What is claimed is:

1. A process for preparing an extract useful for hyposensitization therapy of a substance capable of eliciting an allergenic or antigenic response and containing physiologically active principles, which process comprises:
   (A) extracting the substance with a first aqueous extracting fluid;
   (B) separating and retaining the aqueous extracting fluid containing the water-soluble active principles from the water-insoluble portion of the substance;
   (C) extracting the water-insoluble portion of the substance with a second extracting fluid having a pH of about 7.5 to 12.0 comprising a mixture of an aqueous phase and a heterocyclic tertiary amine selected from the group consisting of pyridine, quinoline, lutidine, collidine and picoline;
   (D) separating the second extracting fluid containing the organic solvent soluble active principles from the water and organic solvent insoluble portion of the substance;
   (E) combining the first and second extracting fluids;
   (F) insolubilizing the active principles contained in the combined extracting fluids by the addition thereto of an aluminum compound; and,
   (G) separating the insolubilized active principles from the extracting fluids.

2. A process as in claim 1 wherein the heterocyclic tertiary amine is pyridine.

3. A process as in claim 1 wherein the organic solvent is a combination of dilute sodium hydroxide solution and pyridine.

4. A process as in claim 1 wherein the substance capable of eliciting an allergenic or antigenic response is an inhalant.

5. A process as in claim 4 wherein the inhalant is selected from the group of allergens consisting of pollens, house dust, epithelium, molds, insect materials, seeds and feathers.

6. A process as in claim 1 wherein the aluminum compound is potassium aluminum sulfate.

7. A process as in claim 1 wherein the insolubilized active principles are resuspended in a physiologically acceptable aqueous fluid prior to use.

8. The product prepared by the process of claim 1.
9. The product prepared by the process of claim 2.
10. The product prepared by the process of claim 3.
11. The product prepared by the process of claim 4.
12. The product prepared by the process of claim 5.
13. The product prepared by the process of claim 6.
14. The product prepared by the process of claim 7.

References Cited

UNITED STATES PATENTS 3,148,121  9/1964  Strauss _____ 424—91
3,148,122  9/1964  Strauss _____ 424—91

SHEP K. ROSE, Primary Examiner

PO-1050
(5/69)

UNITED STATES PATENT OFFICE
CERTIFICATE OF CORRECTION

Patent No. 3,591,677                    Dated   July 6, 1971

Inventor(s)   Margaret Strauss Kramer

It is certified that error appears in the above-identified patent and that said Letters Patent are hereby corrected as shown below:

Column 1, Line 20       Immediately following the word
                        "non-aqueous" insert the word
                        -- organic --.

Column 1, Line 21       Change the fifth word from "in"
                        to  -- the --.

Column 5, Line 40       The word "subsequently" should
                        read  -- subsequent --.

Column 6, Line 8        Insert  -- , -- in between the
                        words "mixing" and "after".

Signed and sealed this 25th day of January 1972.

(SEAL)

EDWARD M. FLETCHER, JR.
Attesting Officer

ROBERT GOTTSCHALK
Commissioner of Patents